April 17, 1928.

E. E. TULLY ET AL 1,666,517

PROPELLING DEVICE FOR SHIPS

Filed Jan. 25, 1927

Patented Apr. 17, 1928.

1,666,517

UNITED STATES PATENT OFFICE.

EDWARD ERNEST TULLY, OF BIRKENHEAD, AND WILLIAM LOVIS, OF LONDON, ENGLAND.

PROPELLING DEVICE FOR SHIPS.

Application filed January 25, 1927. Serial No. 163,341.

This invention relates to improvements in propelling devices for ships.

Under the invention we form the blades of the propeller with openings or recesses at the roots, said recesses or openings having cores or passages leading direct from the roots of the blades to the rear end of the boss, but forwardly of the blade from the root of which it extends and in conjunction therewith openings in the body of the blade leading through passages into the passages from the roots of the associated blades.

Figure 1:
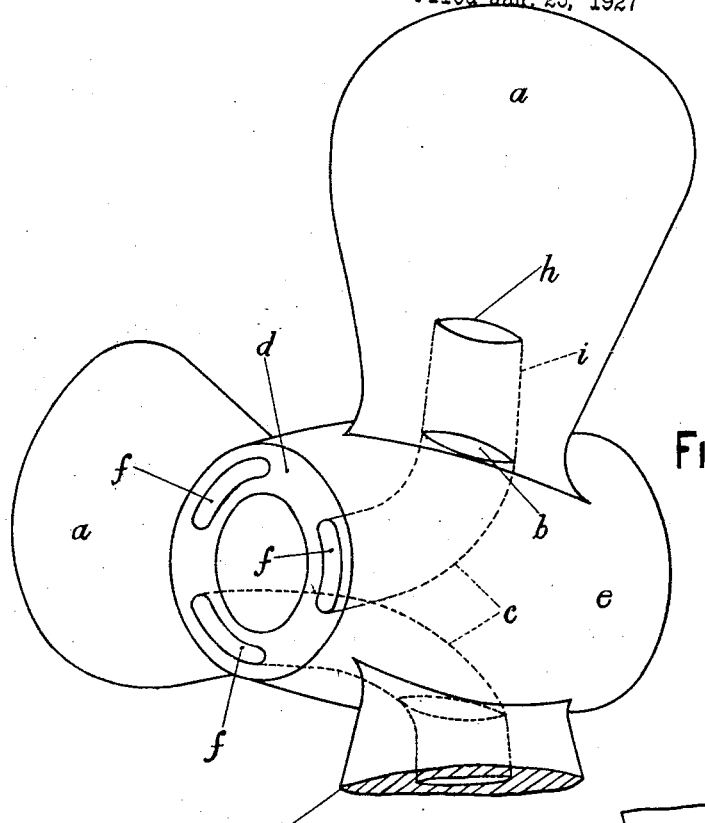
Figure 2:
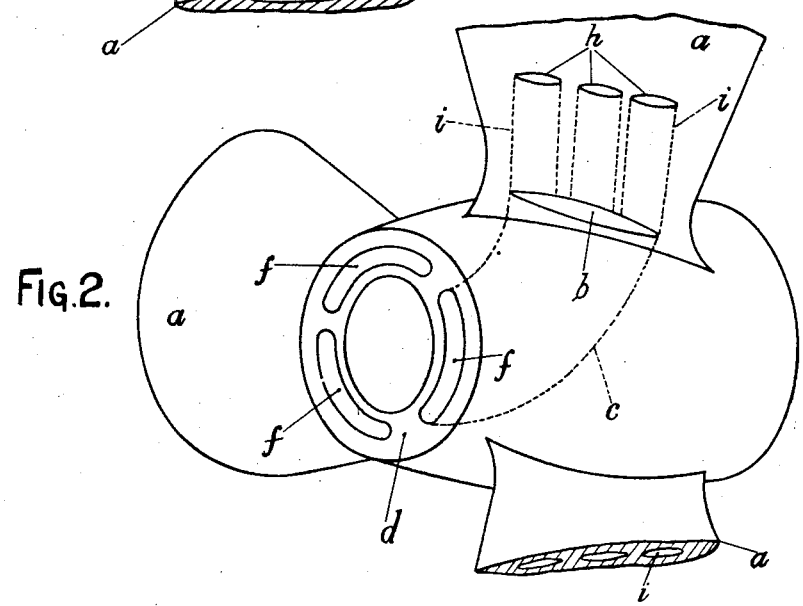

As illustrated in the accompanying diagram which shows the invention applied to a three-bladed propeller, Fig. 1 is a perspective view showing the propeller provided with a single opening in the face of the blade, and Fig. 2 is a perspective view showing a plurality of openings in the face of the blade. Each propeller blade $a$ has an opening or recess $b$ at the root, said recess or opening having a core or passage $c$ leading direct from the root of the blade to the rear end $d$ of the boss $e$.

The boss may be perforated from end to end and is preferably but not necessarily formed tapering towards the rear end. The passage or core $c$ leads to the rear end of the boss where it terminates in a hole $f$ preferably of elongated section situated between the blades but forwardly of the blade from the root of which it extends. In conjunction with these openings and passages we provide openings $h$ in the front face of each blade leading by way of passages $i$ within the blade into the passages $c$ of the associated blade.

By this arrangement the fluid is drawn to the root of the blade whereby the centrifugal motion of the fluid set up by the revolving propellers is in part neutralized, and increased blade surface is brought into action. On account of the jets issuing from the perforations at the rear end of the boss in front of each blade and on account of the shape of the boss, cavitation and also the suction following the vessel is considerably reduced.

Experiments have shown that a higher speed with less revolutions is obtained as also an economy in fuel.

It will be understood that the blades may either be fixed or detachable.

We claim:—

1. A propeller for ships comprising in combination with a plurality of blades formed on a boss, said blades formed with openings at the roots, passages within the boss one extending from each of said openings to the rear end of the boss forwardly of the blade root from which it extends.

2. A propeller for ships comprising in combination with a plurality of blades formed on a boss, said blades formed with openings at the roots, passages within the boss one extending from each of said openings to the rear end of the boss forwardly of the blade root from which it extends, openings in the face of each blade and passages leading from said last-mentioned openings into said first mentioned passages.

In testimony whereof we have signed our names to this specification.

EDWARD ERNEST TULLY.
WILLIAM LOVIS.